United States Patent [19]

Mauch et al.

[11] 3,827,025

[45] July 30, 1974

[54] READING MACHINE EMPLOYING A TWO-DIMENSIONAL MULTIPLE SNAPSHOT PROCESS

[75] Inventors: Hans A. Mauch; Glendon Smith, both of Dayton, Ohio

[73] Assignee: The United States of America as represented by the Veterans Administration, Washington, D.C.

[22] Filed: Aug. 10, 1971

[21] Appl. No.: 170,551

[52] U.S. Cl. .................... 340/146.3 F, 340/146.3 H
[51] Int. Cl. .................................. G06k 9/12
[58] Field of Search .............. 340/146.3 H, 146.3 F

[56] References Cited

UNITED STATES PATENTS 3,289,164 11/1966 Rabinow ..................... 340/146.3 H
3,531,770 9/1970 Mauch ......................... 340/146.3 F

*Primary Examiner*—Paul J. Henon
*Assistant Examiner*—Robert F. Gnuse
*Attorney, Agent, or Firm*—Jerome P. Bloom

[57] ABSTRACT

Apparatus for scanning and translating discrete objects and their images into identifying signals characterized by an image receiving surface including a plurality of photocells arranged in adjacent vertical columns. In use thereof the columns of sensing photocells are caused to scan the image in one direction. The photocells of the respective columns are so related that, at each of a series of locations spaced in said one direction, any one or more of the cells, as determined by the configuration of the image per se, may function as a "key" to trigger an electrical snapshot by a cell or cells then viewing a particular definitive portion of this image. Snapshots in one case are determined by the pertaining cells having been subjected to a certain number of "light to dark" or "dark to light" transitions in the scanning procedure and succeeding snapshots may be similarly determined. In another case the invention provides that the triggering of snapshots by key cells in one column may cause a conditioning of cells on the same level in another column to trigger following snapshots.

Means are included to provide that the snapshots taken of the image in the one direction are electrically stored and the stored representations thereof subjected to an electrical scanning in a different direction. This is done in a manner to reduce the stored representation of the image to the most definitive portions thereof, whereby to enable greater accuracy in the read-out of the image scanned through conventional signalling means.

20 Claims, 5 Drawing Figures

Figure 1:
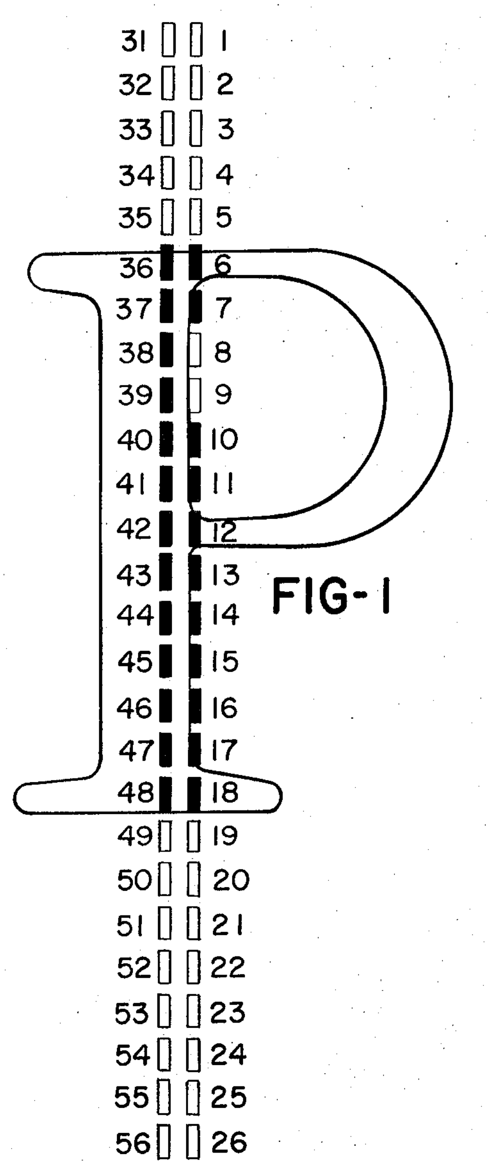

INVENTORS
HANS A. MAUCH
GLENDON SMITH
BY Jerome P. Bloom
ATTORNEY

INVENTORS
HANS A. MAUCH
GLENDON SMITH
BY Jerome R. Bloom
ATTORNEY

INVENTORS
HANS A. MAUCH
GLENDON SMITH
BY Jerome P. Bloom
ATTORNEY

READING MACHINE EMPLOYING A TWO-DIMENSIONAL MULTIPLE SNAPSHOT PROCESS

BACKGROUND OF THE INVENTION

This invention relates to improvements in systems and apparatus for scanning and translating the image of an object scanned into electrical signals which define the object. It provides improvements in applicants' prior system and apparatus constituting the subject matter of U.S. letters Pat. No. 3,531,770 issued Sept. 29, 1970.

The present invention affords, in particular, a character recognition machine or system having superior performance characteristics. It will be so described though not so limited in application.

As related to the apparatus subject of the U.S. letters Pat. No. 3,531,770, the present invention embodiments feature greater tolerance for vertical misalignment between the object scanned, or its image, and the devices employed to sense the same. They provide greater accuracy in their recognition function and are endowed with the capability of accommodating a wider range of characters and the type styles in scanning procedures. Preferred embodiments are equally applicable to sensing print, indicia, impressions, graphic representations, and the like and transmitting more definitive signals then heretofore deemed possible.

As noted in the aforementioned U.S. letters Pat., previously developed scanning and reading devices used for character recognition are generally more complex in structure, more expensive to fabricate and their sensing abilities have been more limited, particularly in reference to their ability to scan and recognize characters of various types and styles. Major prior art problems which the present invention overcomes include difficulties in accommodating misalignment of the scanning apparatus and the objects scanned; difficulties in achieving a properly representative definition of an object scanned or its image and difficulties in controlling cost factors in providing apparatus of the character described.

SUMMARY OF THE INVENTION

The present invention carries forward the advances in the art disclosed in applicants' U.S. letters Pat. No. 3,531,770, directed to "Scanning and Translating Apparatus." It expands and refines the novel concepts which applicants presented in said patent and adds significant new achievements. In the prior patented invention, as applied to scanning characters in the form of letters, for example, its basic concern was to take laterally dispersed "snapshots" of letter portions at locations determined by the letter image itself, through the use of key photocells. The present invention concept refines this practice. It uses for scanning, in preferred embodiments, a plurality of adjacent vertical columns of photocells so arranged to cooperate with each other in a unique and novel way enabling any one or more of the included photocells, all of which may function in taking snapshots, to dictate the triggering of an electrical snapshot. Operatively connected to the sensing photocells are related storage means, such as electrical registers. As will be here illustrated, in preferred embodiment the results of each of the snapshots of an image scanned are stored in a first register to produce therein a representation corresponding to a laterally skeletonized version of the image. Means are included to subject this stored image to an electrical scanning in a direction different from that in which the image was first scanned. In the course of this secondary scanning, in the vertical direction in the embodiment here illustrated, selective electrical snapshots are taken which are stored in a second register. The result of this second "snapshot" procedure is an electrical representation of the image which has been reduced in two senses or directions so as to represent its most definitive features. The stored version of the image so reduced is then translated by conventional signalling means and procedures.

The improvements enabled by the above are such to achieve scanning and translating apparatus particularly efficient in its recognition capabilities and highly accurate in its translation of the images of the object scanned. While gained at the cost of a somewhat more complex circuitry than in applicants' previous patent, embodiments are nevertheless still compact and inexpensive, due to the novel concepts contained in the present application. Thus, the present invention achieves the desired results with a minimum of hardware.

A primary object of the invention is to provide improvements in the art of sensing print, indicia, impressions, graphic representations, and other objects and translating the same into more definitive signals.

Another object of the invention is to provide an improved scanning and translating apparatus which is economical to fabricate, more efficient and satisfactory in use, adaptable to a wide variety of applications and substantially free of malfunction problems.

Another object of the invention is to provide scanning and translating apparatus wherein the scanning means include sensing photocells arranged in adjacent vertical columns the cells of which cooperate with each other in a manner that each photocell may act as a "key" cell and trigger electrical snapshot taking by any portion of the total of the cells in said columns.

A further object of the invention is to provide scanning and translating apparatus wherein the scanning means includes sensing photocells arranged in vertically adjacent columns the cells of which cooperate with each other in a manner that each photocell can act as a "key" cell and trigger electrical snapshot taking through the medium of related cells of adjacent vertical columns.

Another object of the invention is to provide improvements in scanning and translating apparatus featuring a unique scanning and translating system wherein images of objects scanned are first subjected, in one direction, to spaced electrical snapshots which are stored as an electrical version of a skeletonized image of the object scanned, which image is reduced in said one direction, whereupon this version of the image is then subjected to taking of further snapshots in a different direction to produce a resultant electrical image form which is now skeletonized in two directions, enabling thereby a simplified read-out as to the nature and character of the object scanned.

Another object of the invention is to provide improved scanning means featuring adjacent vertical columns of photocells functioning to trigger laterally dispersed snapshots and produce an image which is further scanned in a vertical sense to result in an electrical image of the object scanned which is critically related to its definitive features.

An additional object of the invention is to provide improved scanning and translating apparatus having a wider range of acceptance of characters and type styles and a higher recognition accuracy using a minimum of hardware.

An additional object of the invention is to provide apparatus of the type described possessing the advantageous structural features, the inherent meritorious characteristics and the means and mode of operation herein described.

With the above and other incidental objects in view as will more fully appear in the specification, the invention intended to be protected by letters Patent consists of the features of construction, the parts and combinations thereof, and the mode of operation as hereinafter described or illustrated in the accompanying drawings, or their equivalents.

Referring to the drawings wherein a prefered but not necessarily the only form of embodiment and application of the invention is shown.

Figure 3:
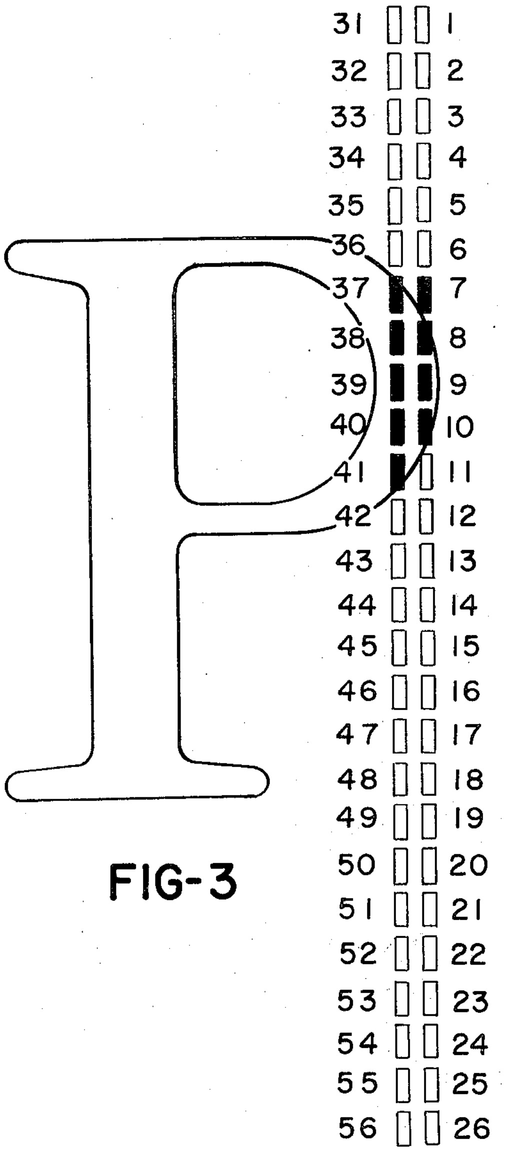
Figure 4:
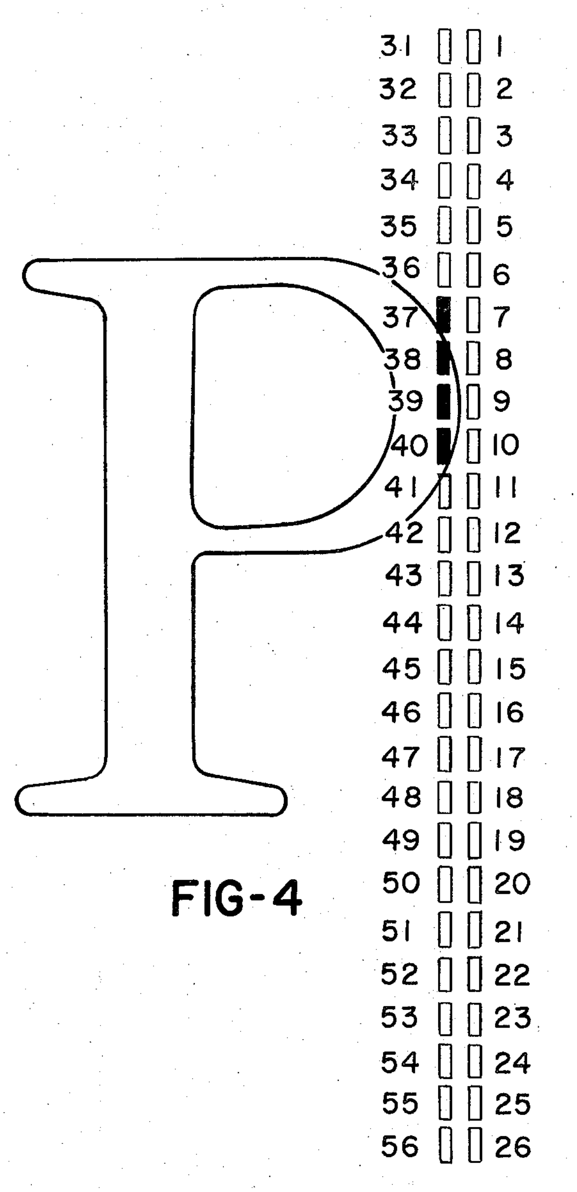
Figure 5:
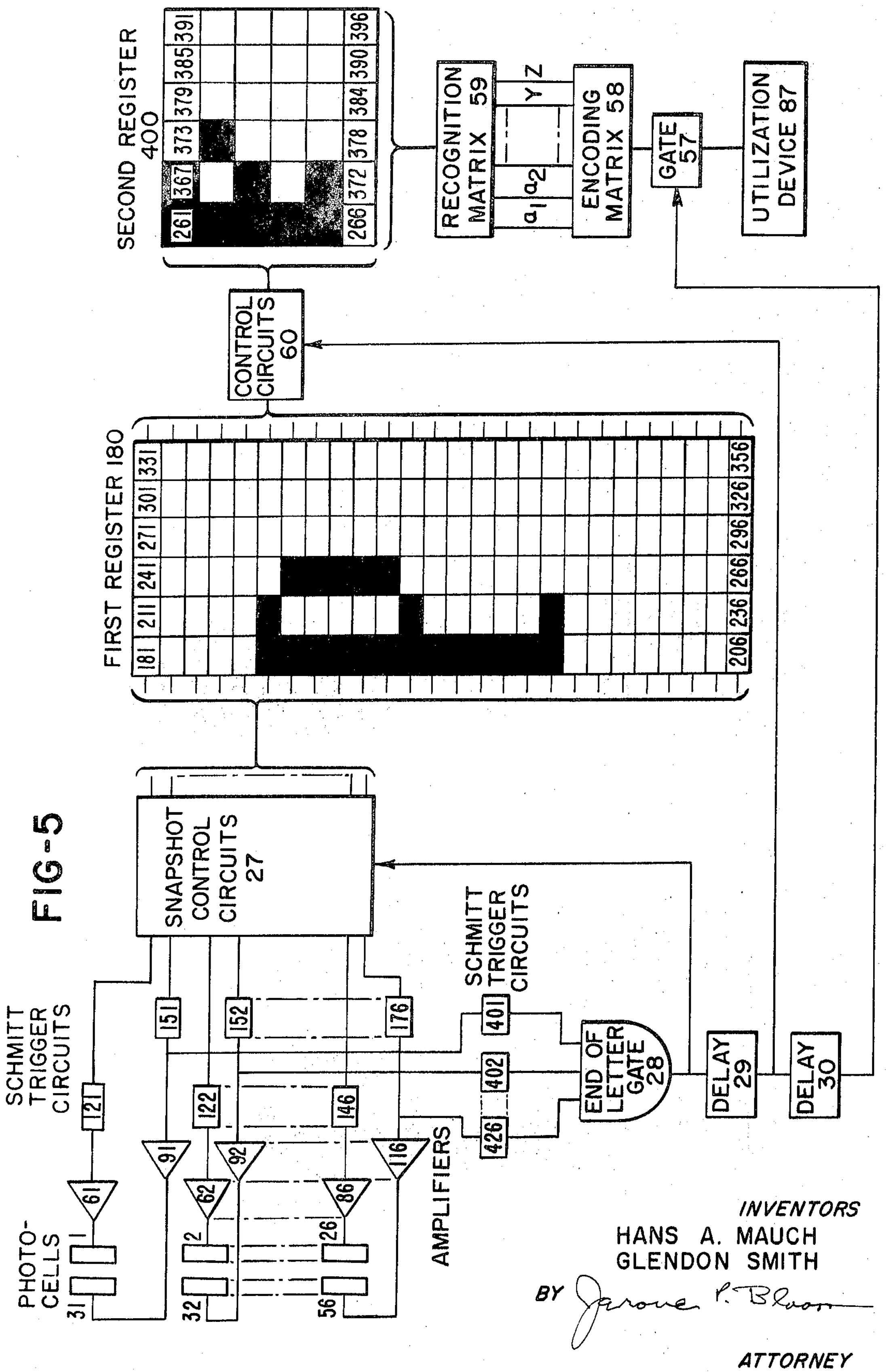

FIGS. 1 through 4 present schematic diagrams of the function of sensing photocells employed in accordance with the present invention, the respective figures showing successive snapshot positions of the image of a letter P in the course of relative movement of the letter and the sensing photocells. As shown, the relative movement of the letter is from right to left in reference to the scanning photocells; and FIG. 5 is a partial schematic or block diagram of the essential components of a reading machine embodying the sensing photocells illustrated in FIGS. 1 through 4.

Like parts are illustrated by similar characters of reference throughout the several views.

The invention can be best described with particular reference to the accompanying drawings which illustrate the essential features of a character or object reading machine embodying the concepts of the present invention in a preferred embodiment. Only so much structure is illustrated as required by one versed in the art to have a complete understanding of a reading machine in accordance with the present invention. For additional detail and reference subject matter, attention is directed to the U.S. letters Pat. No. 3,531,770, aforementioned.

In this instance the reading machine of the invention includes a screen which, as schematically illustrated in FIG. 1, embodies an array of photocells particularly suited for sensing upper and lower case letters and ligatures of the type and style most commonly used in current American books, newspapers, and typewritten matter. Conventional apparatus may be employed to transmit the character or other object images to the screen such as described in the U.S. letters Pat. No. 3,531,770. The scanning motion as illustrated in FIGS. 1 through 4 may be obtained by any suitable means which may provide either for movement of the scanned letter or object or movement of the scanner embodying the photocells for sensing the image of the letter or object scanned.

To facilitate an understanding of the invention, the drawings show the scanned character in an upright position and indicate its nature and its particular relation to the sensing components as constituted by the illustrated photocells. It is to be understood, however, that in actual practice a lens may be used to transmit the image in inverted form.

Referring to FIG. 1, a preferred embodiment of the invention utilizes a screen comprising an array of 52 photocells arranged, as shown, in two vertical columns of 26 cells each. In the first or right hand column, the cells are equidistantly and vertically spaced and numbered 1 through 26 from top to bottom. In the second column, the cells are vertically spaced as in the case of the first column and respectively numbered, from top to bottom, 31 through 56. In scanning, as previously noted, the relative movement of the image of the character or object scanned is from right to left. Thus, a dark image of an upper case letter "P" is shown in FIGS. 1 to 4 to be moving from right to left and in the case of each figure there is depicted the relative position of the photocells in respect to the image at the instant corresponding to the taking of each of four successive laterally dispersed snapshots.

Figure 2:
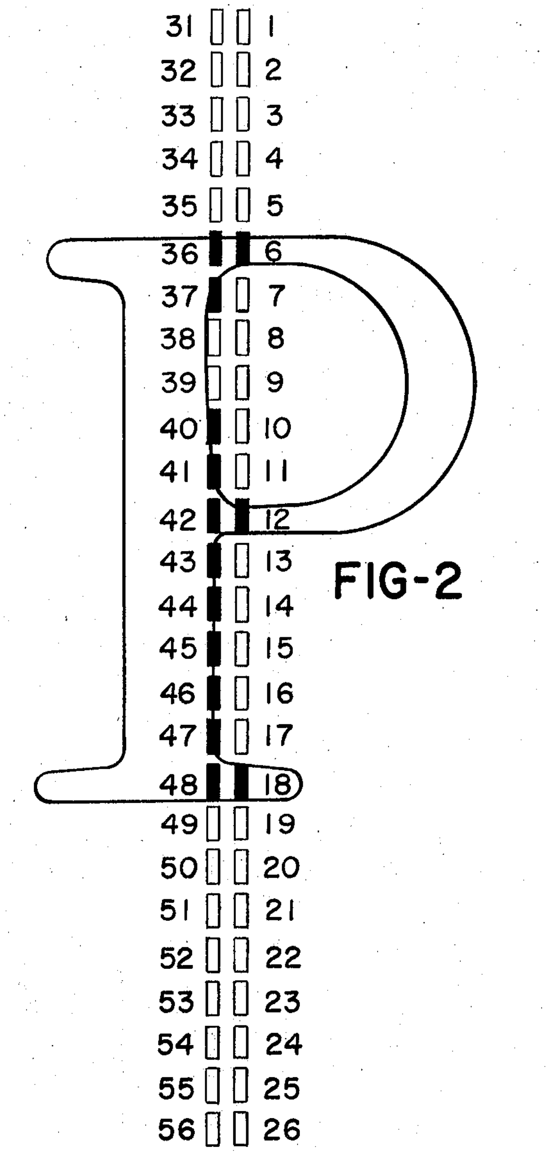

In accordance with the invention, the form of the image per se determines when a snapshot is taken. Noting FIG. 1, as the letter "P" moves over the photocells, electrical snapshot control circuits 27, to be further described, begin counting transitions in the photocells from sensing dark to light as soon as they occur in reference to the cells in the right hand column occupied by the vertically spaced cells 1 through 26. As will be self-evident from FIG. 1, the first electrical snapshot is in this instance taken immediately after two cells (8 and 9) in that column have a transition to "seeing light" from "seeing dark." Please note that the system may provide, however, depending on its application, that the first snapshot is taken immediately after any predetermined number of cells in the right hand column sense a change from dark to light. The example of the two cells is merely for purposes of the present illustration. Note also that with a straight vertical dark line moving over portions of the cells in the first column at the same time there will be only a small amount of time between successive photocell circuits switching from one sensing state to the other. Since several circuits may switch so nearly at the same instance that it is not possible to determine the correct sequence, an order will be suitably assigned by means of priority circuits in a conventional manner. In this instance, the priority circuits will provide that the second cell to sense light in FIG. 1 is the photocell 8. This cell will dictate the taking of the first electrical snapshot to represent the letter "P" as shown in its position in FIG. 1 of the drawings, which snapshot, in the example illustrated, is related to the light or dark conditions of cells 31 through 56. In this case, which represents one of the preferred modes of invention embodiment, the cell 8 is interrelated to the adjacent cell 38 to condition it to order, on a predetermined position of the letter "P" in scanning, such as shown in FIG. 2, that a second electrical snapshot be taken of the letter "P." It should be understood that in the alternative this position might be determined by counting transitions from dark to light in the cells 31 through 56 but in this described embodiment it is optimally insured that potential problems be avoided by allowing the triggering cell in the right hand column to condition the corresponding cell on the same level in the left hand column to order a snapshot in its transition from sensing dark to sensing light. This second snapshot occurs when the image of the letter has advanced a distance approximately equal to or preferably slightly greater than the center to center spacing between the photocell columns themselves. The second snapshot is here related to the dark and light conditions of the cells 1 through 26 at the instant the same is triggered by photocell 38.

As noted just above, the interrelation between the cells of the respective columns to produce a triggering of the second snapshot as determined by the cell or cells which trigger the first is not the only manner in which the second snapshot may be triggered in utilizing the invention concept. The second snapshot may be determined by counting the number of transitions from dark to light of the cells of the second column per se until the count corresponds to the position of the image shown in FIG. 2, whereupon, as determined by the image per se, the key cells 38, 39, than seeing light will be used to trigger the second snapshot. This alternative may be used in certain applications. However, for more critical applications the procedure of the preferred embodiment should be utilized.

Attention is directed to the fact that the cells of any column may be utilized as "key" cells and utilized in any particular sequence, as determined by the nature of the image scanned and its configuration, to produce the necessary snapshots.

As will be pointed out with reference to FIG. 5 of the drawings, there are Schmidt trigger circuits 151–176 and 121–146 so related to the respective columns themselves and so constructed that photocells 31 through 56 must have a larger percentage of their areas in light or background portions of the letter image to signal "seeing light" than is the case for the cells 1 through 26 inclusive in the right columns.

Referring further to FIG. 5 of the preferred embodiment illustrated, the action which constitutes the taking of the first snapshot results in entering the dark-light conditions of all the cells in the column of cells 31 through 56 into corresponding storage positions of a first column 181–206 of a first register 180. Thus, in FIG. 1 the letter "P" is in the position shown in which the image per se has caused two transitions from dark to light (i.e. cells 8 and 9) and this dictates the taking of the first snapshot through the medium of cell 8, which snapshot is in the form of a transmission of the respective conditions of the cells 31 through 56 sensing light or dark, or rather the signals thereof, into corresponding elements for the storage of this information respectively in the positions 181 through 206 of the register 180. When the letter "P" has relatively positioned itself in respect to the photocells 1 through 56 as shown in FIG. 2, the second snapshot is represented by similar signal transmission to storage elements 211 through 236 of the respective conditions of the cells 1 through 26 inclusive sensing light or dark at the particular instant at which the snapshot is taken. As previously noted, the timing of the second snapshot is here represented by the key cell 38 changing from sensing dark to sensing light, the snapshot being triggered by the cell 38 in the changing of its condition.

Thus, to this point there have been two electrical snapshots and the respective conditions of cells 31 through 56 and 1 through 26 at the instants of taking the same are represented in the first two columns of the register 180 as shown in FIG. 5 of the drawings.

After the taking of the second snapshot there are suitable snapshot control circuits 27 provided in conventional manner which again begin counting the transitions of photocells in the column including 1 through 26 from dark to light. At the instant of a predetermined number of transitions in this right hand column a third electrical snapshot is taken. In this embodiment four transitions in the sequence 18, 12, 6 and 11 are used, as determined by the shape of the image. The position of the letter "P" at the instant of the third snapshot is shown in FIG. 3. In this case the cell 11 is the one to make the fourth transition as determined by the shape of the image. Thus, cell 11 is used as a key cell which orders the third snapshot at the instant and relative position of the letter "P" and the photocells as illustrated. At the moment that the cell 11 senses a change from dark to light it triggers the system to provide that the dark-light information of the cells 31 through 56 be transmitted to and stored in the respectively related storage elements represented by the series of elements 241 through 266 in column 3 of the register 180, as schematically shown in FIG. 5 of the drawings. The cell 11 is here connected to condition the corresponding cell 41 at the same level in the left hand column of cells to initiate the taking of the fourth snapshot, which occurs on the relative positioning of the "P" in reference to the photocells as seen in FIG. 4 of the drawings. Here the cell 41 has changed from a condition of sensing dark to a condition of sensing light. At this point the respective cells 1 through 26 are electrically connected or triggered to transmit their light-dark conditions to the storage elements in register 180 represented by numerals 271 through 296.

With the taking of the laterally dispersed snapshots of the letter "P," four in number, the sensing of information required in this instance is concluded. Where there are wider letters scanned, such as the letter "M," more snapshots may be needed and the same may be provided for, there being additional columns of storage elements provided for this purpose in the register 180. In such case, in the embodiment illustrated, the cell of cells 1 through 26 which makes the seventh (or other predetermined number depending on the image) transition from dark to light causes the dark-light information of the cells in the column including cells 31 through 56 to be stored in a succeeding column in the register 180 (301–326) and conditions its counterpart, on the same level in the column of cells 31 through 56, to signal an additional snapshot when the image movement is completed. The number of transitions (2, then 4, then 7) needed to initiate the odd numbered snapshots in this embodiment are chosen to minimize the size of the register 180, constituting a first register, by limiting the number of snapshots and by concentrating them on those parts of the letter scanned which can be expected to contain the most important information. Although a maximum of six snapshots have been described, machines based on the invention principle may need and use more or less, depending on their intended applications.

The foregoing has set forth the basic mode of function and signal transmission in preferred use of the sensing photocells 1 to 26 and 31–56. Attention is now directed to the block diagram of FIG. 5 which schematically illustrates the major parts of the reading machine in accordance with the preferred embodiment of the invention. At this point it is noted that the photocells 1–26 and 31–56 may be of any type. Also the number of the cells and their sizes will depend upon the design requirements and their application but generally they should be quite small and closely spaced in their column arrangement.

In any case, to more specifically indicate the method by which the signals are transmitted to the register 180 in the first instance, it will be seen from FIG. 5 that each photocell 1 through 26 sends a signal to an interconnected amplifier, respectively 61 through 86, which corrects for the individually related photocell characteristics and, in the case of photoconductive cells, compensates for the slow responses to rapid changes in light intensity. Correspondingly, each of the photocells 31 through 56 respectively sends an appropriate signal of its condition to a respectively related amplifier 91 through 116, as the case may be.

Now, to describe the Schmitt trigger circuits which are also respectively related to the photocells, assume that when all photocells are exposed to the light area surrounding a dark character or object image all amplifiers have an output voltage of a positive 10 volts and when any photocell is half covered by a portion of the character or object, the associated amplifier has an output of 5 volts. Full coverage of the photocells by a dark image would yield an output of zero volts. In the example illustrated, Schmitt trigger circuits 121 through 146, respectively associated with the photocells 1 through 26 are preferably made the most sensitive. For example they will be switched from a "white" to a "black" state at an input voltage of 8.5 volts and from "black" to "white" at an input voltage of 9.0 volts. The half volt difference or hysteresis reduces the chance of either electrical or optical "noise" (produced for instance by the ragged edge of a horizontal line image passing over a photocell) causing unwanted operation of the Schmitt trigger circuits. Correspondingly, the Schmitt trigger circuits 151 through 176 which are respectively connected to and make the dark-light decisions for photocell signals from the cells 31 through 56 to the snapshot control circuits 27 are preferably less sensitive and, for example, switch at 7.5 and 8.0 volts. Those Schmitt trigger circuits 401 through 426 shown in connection with the gate 28 in FIG. 5 will be the least sensitive and operate at 6.5 and 7.0 volts, for example.

The snapshot control circuits 27 represented in block form in FIG. 5 are combinations of standard logic elements such as gates and counters which determine when the criteria for each snapshot are met. At such instants the appropriate binary signals from the photocells representing "seeing light" or "seeing dark," as the individual case may be, are directed to and stored in the proper unit of the first register 180. As has been evident from the foregoing discussion and from the representation in FIG. 5 of the drawings, the first register 180 constitutes a temporary storage facility the elements of which provide a register of 26 horizontal rows, corresponding in number to the number of photocells in each column of the array. Also, the storage elements are arranged in six vertical columns to provide the maximum number of positions corresponding to those required for the maximum of six snapshots described in the example illustrated. Note that the storage of the information scanned is such to eliminate much unessential information while there is a preservation in the register of the essential shape of the letter scanned. The detail of the storage elements and their characteristics is not set forth herein since in and of themselves they do not constitute any part of the present invention. Moreover, with the invention as described, the storage elements may be of a nature and connected in any manner well known to those practicing the art which is subject of the present invention. It will be seen from FIG. 5 that there is produced in the register 180 an electrically stored representation of a simplified letter image which is laterally reduced in size but retains the relative height and vertical position of the image scanned by the photocell array including the two vertical columns containing the cells 1–26 and 31–56 inclusive.

In practice the scanning of the letter or any image is completed by virtue of a signal by all the photocells 31–56 in the left-hand column in FIGS. 1 through 4 seeing nearly white or white light simultaneously. At this point the end-of-letter "AND" gate 28 is connected by way of Schmitt trigger circuits 401 through 426 inclusive to provide appropriate signals thereof through delay mechanisms 29 and 30 which may be of any conventional nature. Note that an undelayed signal to the snapshot control circuits 27 as represented in FIG. 5 causes further laterally dispersed snapshots to be prohibited for a duration which is less than the time available between objects (letters of a word in the example illustrated) being scanned. The end of letter signal which is delayed through the mechanism 29 initiates the actions of control circuits 60 as seen in FIG. 5. In this instance the circuits 60 are interconnected with the elements of the first register to perform the task of introducing the snapshot information of the letter image stored in the register 180 into a second register 400. This is achieved, by way of example, in the following manner. Of course, the same can be modified in a number of ways without departing from the inventive concept and it can still lead to an equivalent functional result.

Starting at the top row of the register 180, each element in the row is compared as to its condition with the corresponding element in an equally long initially empty reference row of storage elements located within the control circuits 60. If there is no difference in comparison of the top row of the first register, the next horizontal row of elements of the first register 180 is electrically compared as to the respective conditions thereof with the said reference row of the control circuits 60. On the occasion of the first row encountered in the register 180 wherein elements differ in condition from the said reference row elements, the control circuits provide that the corresponding information so indicated be transmitted to the first horizontal row of storage elements in the register 400. The transmitted information is at the same time stored in the reference row in the control circuits 60 for comparison with the next descending horizontal row of elements of the register 180. This process is repeated. When successive horizontal vertically adjacent rows in register 180 have the same condition, only the first is transmitted by the control circuits 60 to a horizontal row of storage elements of the register 400. When there is a difference in the condition of the storage elements in register 180 in a succeeding descending horizontal row, then the information from that row will be transmitted by the control circuits 60 to the next descending row of storage elements in the register 400 and simultaneously stored in control circuits 60 for comparison with it of the next descending row of register 180. Of course, the electrical image of the object scanned will be precisely reproduced in the transmission, in respect to the pertaining rows information of which is transmitted to the register 400. The process of the control circuits selectively transmitting image portions to the register 400 will be repeated until, as shown in FIG. 5, the letter shape stored in the register 180 has been reconstructed in the register 400 in a vertically reduced skeletonized fashion. It will be observed, as described, that the control circuits function to cast out identical adjacent row formations which do not contain much essential information. Of course, in referring to letter shape its electrical representation is intended.

This last procedure may be started from the bottom row of the register 180 (and the bottom row of register 400). However, starting at the top has certain advantages. For example, photocell columns can miss part of the descender of letters due to vertical mistracking without causing a recognition error. This is inherent in the system provided.

A result of the described process of taking the secondary, vertically dispersed snapshots of the electrical information in register 180 is the normalizing of the vertical position of the letter in the information stored in register 400. This is important in eliminating the effects of mistracking and, in conjunction with the skeletonizing, facilitates the recognition of a greater range of basically similar type styles in the observation of characters.

The number of vertically adjacent horizontal rows in which the storage elements have similar character which can be discarded can be limited so that a lower case "1" (without serifs) does not shrink to a point in the storage representation in the register 400 and thus appear in signal form as a period. Alternatively, a count of the number and sequence of discarded rows can be made and this data can be applied to a recognition Matrix 59 along with the transmission of the storage contents of the register 400 for better recognition results.

The recognition Matrix 59 will be constructed in the well known manner with diodes or digital gates. Another approach could utilize resistors with weighted values and comparators which could select the most likely identity for the character just scanned. In either case several skeltonized versions of the same letter are possible and the Matrix will have outputs for each. The same applies to capitals and lower case letters. Of course, since the manner of effecting and nature of a recognition Matrix is well known in the art, this is not further described, particularly since the same does not contribute to nor is it required for an understanding or an application of the present invention. To carry this a step further, different versions of the same letter can be combined in "or" logic within an encoding Matrix 58 shown in FIG. 5 which produces a binary code such as the Baudot code corresponding to the identified character. At the proper time, determined by the delay mechanism 30 (when processing is complete and the signals have propagated through the circuit elements) the gate 57 will pass the binary code to a utilization device 87 which may be located remotely. The device 87 may include temporary storage facilities accommodating the recognition results which compensate for the variable scan rates allowed by the recognition principle in conjunction with fixed rate output devices, and which permits grouping the letters into words. For this purpose, a large photocell, not shown, will be utilized to detect word spaces and additional circuitry will be provided to develop special signals to accommodate the necessary grouping. It should be self-evident that, with the use of the invention, scanning can be effected at any speed within the capabilities of the photocells and circuit elements.

After the logical processing for a character to be identified has been completed, the snapshot control circuits 27 and the control circuits 60 will be arranged to re-set all elements of the register 180 and the register 400 to their initial conditions, storing the binary signal which represents white, and return all internal logic elements to their initial states, ready to process the next character.

From the foregoing it will be seen that the invention system and apparatus, particularly in preferred embodiment, has refined the procedure for image recognition to a degree that the apparatus concentrates on the most important detail and obviates mis-reading due to picking up unessential and confusing information. The invention is particularly advantageous for example in enabling an improved reading machine for the blind where the sensing screen may be embodied in a hand held probe which may be moved in erratic fashion and therefore at a non-uniform speed. It will be obvious from the foregoing that while described in limited application, the invention may be applied to recognition of any object or its image.

In order that the description of the invention be rendered concise, its specific embodiment has had limited illustration. However, from the foregoing it must be understood certain concepts are basic to the invention and the use thereof may be embodied, in various form. For example, one of the basic concepts provides for a screen of image sensing photocells to be arranged in columns and so interconnected that any one or more of the cells may function to trigger an electrical snapshot by certain of said cells viewing a definitive portion of an image. The point of triggering in such case is primarily determined by a series of light to dark or dark to light transitions of cells, the number of transitions and the involved cells for any particular snapshot (which may include the triggering cell) being dictated by the nature and configuration of the image scanned. The invention further teaches how to achieve an optimal readout by its system which provides for cells of one column of a plurality thereof to function as key trigger cells and at the same time condition cells on the same level in another column of cells to cause triggering of following snapshots.

A basic and important concept features the electrical storage of the representation of each electrical snapshot taken by the columns of photocells forming the sensing screen, the snapshots being taken in respect to portions of the scanned image which are spaced in one direction. The stored composite is then utilized as the object of a secondary scanning procedure taken in a direction different from said one direction to produce a second category of snapshots which reduce the representation of the image to its most critical aspects. The whole enables the representation of the image scanned enabling a substantial improvement of its definition in translation and a greater accuracy in its read-out.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

Having thus described our invention, we claim:

1. Apparatus for scanning and translating objects and images into definite signals, comprising means defining a screen for sensing an object or image including a plurality of photosensitive elements arranged in a plurality of adjacent columns, each of which columns contains a plurality of said elements, said elements being connected in circuits including means arranged to count the transitions in light values sensed thereby in the course of a relative movement between said photosensitive elements and an object or image in a direction transverse to said columns and providing that said elements are conditioned to respond to transitions in light values sensed thereby and to function as key elements on occurrence of counter means reflecting the sensing of a predetermined plurality of said transitions, said circuits providing that the determination of the key elements is governed solely by the configuration of said image or object scanned and its particular level within the limits of said columns in the course of said relative movement, means being provided to trigger an electrical snapshot of a portion of said object or image by a group of said elements each time any of said elements have been induced to function as key elements, and means connected to store an electrical representation of each of said snapshots and to extract and transmit signals definitive of critical features of the total of said snapshots whereby to enable an accurate readout of the image scanned.

2. Apparatus as in claim 1 characterized by said extracting and transmitting means including means for electrically scanning the said stored representations of said snapshots in a second direction different from said transverse direction and to transmit signals definitive only of the successive changes in features of the total of said stored snapshots as scanned in said second direction.

3. Apparatus as set forth in claim 1 characterized by said storing and transmitting means including a first storage device arranged to electrically reproduce therein a representation of said snapshots taken by said photosensitive elements, a second storage device, and means for electrically sensing the said electrically reproduced representation and extracting and transmitting to said second storage device only selective portions of said electrically reproduced representation which correspond to its definitive features.

4. Apparatus as set forth in claim 1 characterized by said key elements, as determined by the configuration of the image or object scanned, being connected to condition other of said elements to trigger snapshots of an object or image scanned in following relation to the triggering of a snapshot thereby.

5. Apparatus as set forth in claim 4 characterized by said key elements being respectively disposed in one of said columns and said elements conditioned thereby being disposed in other of said columns.

6. Apparatus as set forth in claim 1 characterized by the interconnection of said elements providing means for each said column of elements to selectively function as a whole to produce a snapshot in response to a triggering thereof by a key element.

7. Apparatus as in claim 1 characterized by said elements being interconnected to cause said columns to individually function to take snapshots in repetitive sequence.

8. Apparatus for scanning and translating objects scanned, and their images, into definitive signals as in claim 1 characterized by said photosensitive elements being arranged in a plurality of spaced columns, and each of the key triggering elements being operatively connected to selective of said elements included in other than its own column to condition the said selective elements to trigger additional electrical snapshots or other portions of said image object or in following relation thereto.

9. Apparatus as in claim 8 characterized by said photosensitive elements being electrically connected so said columns in repetitive sequence will contain the triggering elements producing said electrical snapshots of an object or image scanned.

10. Apparatus as set forth in claim 1 characterized by said columns of elements being interrelated to said respective triggering elements to take electrical snapshots in repetitive sequence in the course of scanning an object or its image in a manner to produce laterally dispersed electrical snapshots thereof definitive of the image of the object or its image scanned.

11. Apparatus as set forth in claim 1 characterized by a first register of electrically activated elements arranged to receive and store said snapshots so as to embody the critically observed portions of the object or image and produce a representation thereof which eliminates non-critical portions thereof sensed in said transverse direction.

12. Apparatus as set forth in claim 11 characterized by means defining a second register of electrically activated elements and means for electrically scanning said representations in said first register in a second direction substantially at right angles to said transverse direction of scanning and electrically transmitting to said second register electrical snapshots of the object or image determined by each definitive change in said representation sensed in the scanning of said representation in said second direction.

13. Apparatus as set forth in claim 12 characterized by said means for scanning said first register including means for rejecting portions of the electrical reproduction of said object or its image in the first register and for electrically transmitting to said second register only definitive portions thereof.

14. Apparatus as set forth in claim 1 characterized by said photosensitive elements being arranged in a pair of adjacent longitudinally extended columns which are laterally spaced in side by side relation, said elements being electrically connected in circuits providing that the elements of one column are specifically connected to a selective one of the elements in the adjacent column so that on a triggering function of one element to serve as a key element, the specifically connected element in the adjacent column is conditioned to serve a triggering function upon a predetermined sensing condition thereof referenced to the image of the object or image scanned in the course of the scanning procedure.

15. Apparatus as set forth in claim 14 characterized by the arrangement of said photosensitive elements providing for elements of said columns to alternately function to produce electrical snapshots.

16. Apparatus as set forth in claim 1 characterized by storage means defining a register of electrically energizable elements in adjacent longitudinally extended columns, each said column being adapted to receive a selective one of said snapshots whereby to electrically reproduce the portions of said object or image of which the snapshots are taken.

17. Apparatus as set forth in claim 16 characterized by a second register of electrically energizable elements arranged in a plurality of longitudinally extending columns and means for electrically scanning the electrical reproductions in the first said register in a sense different from the sense of said one direction in which the image or object is first scanned and transmitting to said second register only selective definitive portions of the said snapshots as reproduced in said first register whereby to reduce the object or image scanned to its critical elements in a plurality of senses.

18. Apparatus for scanning and translating objects or images scanned into definitive signals comprising means for producing a series of electrical snapshots of spaced definitive portions of an image or object being scanned in one direction including means which count transitions in the light values observed by the scanning means in the course of a relative movement thereof in relation to the object or image, means for electrically storing said electrical snapshots in response to said counting means, means for electrically scanning the stored version of said object or image in a second direction at right angles to the first including means activated only by definitive changes in the configuration of the stored version in the direction scanned for transmitting only critical portions of the first taken snapshots to extract therefrom the most critical elements of the image or object scanned and means connected to produce an electrical transmission therefrom of a definitive signal of the object or image scanned.

19. Apparatus as set forth in claim 18 characterized by said means for producing said snapshots including first a series of photocells arranged in adjacent vertical columns, the relative scan of the object or image being transverse to said columns, said columns being connected to function in repetitive sequence to produce the first said electrical snapshots, said means for storing said snapshots and transmitting only selected portions thereof including a first register of electrically responsive elements for storing the results of said first snapshots and a second register of electrically responsive elements having in connection therewith means for the vertical scanning of the first said register and extracting therefrom only selected portions of said snapshots as determined by definitive changes sensed in the representation of said snapshots whereby to produce an electrical reproduction of most critical portions of the object or image scanned and enable the signalling of a highly definitive translation of the object or image.

20. Apparatus for scanning and translating objects or images scanned into definitive signals comprising means for producing a series of electrical snapshots of spaced definitive portions of an image or object being scanned in one direction, means for electrically storing said electrical snapshots, means for electrically scanning the stored version of said object or image in a second direction at right angles to the first including means activated only by definitive changes in the configuration of the stored version in the direction scanned for transmitting only critical portions of the first taken snapshots to extract therefrom the most critical elements of the image or object scanned, means connected to produce an electrical transmission therefrom of a definitive signal of the object or image scanned, the first said means including a sensing screen comprised of a plurality of adjacent columns of photosensitive means, each column including a plurality of photosensitive means arranged to function as key means operative to trigger electrical snapshots of the object or image being scanned at spaced intervals and the plurality of photosensitive means in each of said columns being interrelated to photosensitive means in other of said columns to be conditioned by the interrelated photosensitive means on function thereof as key means to produce additional electrical snapshots, said snapshots being series related so said columns function in repetitive sequence to produce said electrical snapshots.

* * * * *

UNITED STATES PATENT OFFICE
CERTIFICATE OF CORRECTION

Patent No. 3,827,025 Dated July 30, 1974

Inventor(s) Hans A. Mauch and Glendon Smith

It is certified that error appears in the above-identified patent and that said Letters Patent are hereby corrected as shown below:

Column 9, line 44, "skeltonized" is corrected to read -- skeletonized --.

Column 11, Claim 1, line 2 thereof, "definite" is corrected to read -- definitive --.

Column 12, Claim 8, line 9 thereof, "or" first occurrence is corrected to read -- of --;

same line, "image object or" is corrected to read -- object or image --.

Signed and sealed this 5th day of November 1974.

(SEAL)
Attest:

McCOY M. GIBSON JR.
Attesting Officer

C. MARSHALL DANN
Commissioner of Patents